June 24, 1930.  V. C. KING  1,766,754
SECTIONAL WIRE CONVEYER BELT
Filed April 12, 1929
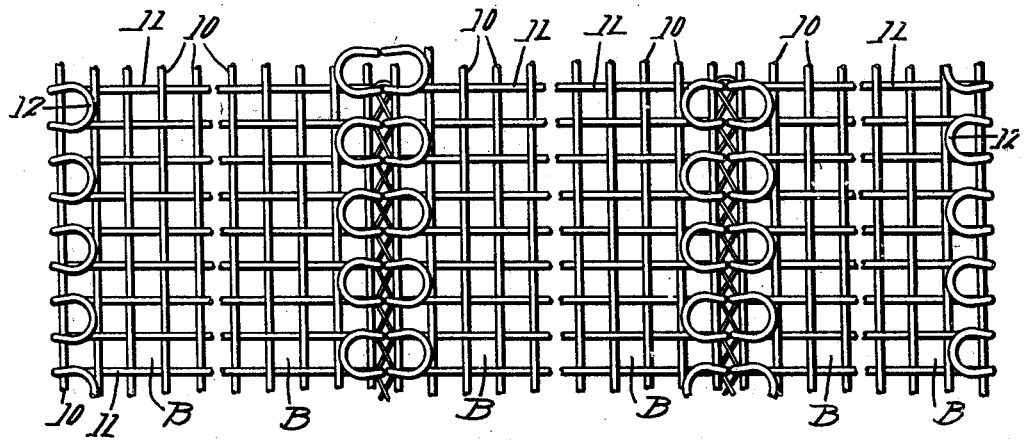
Fig. 1.
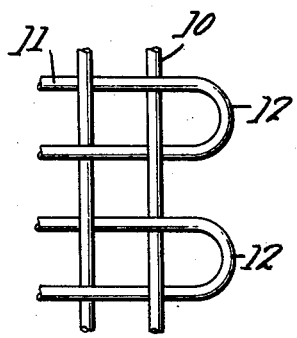
Fig. 2.
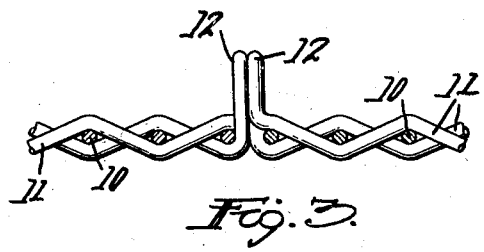
Fig. 3.
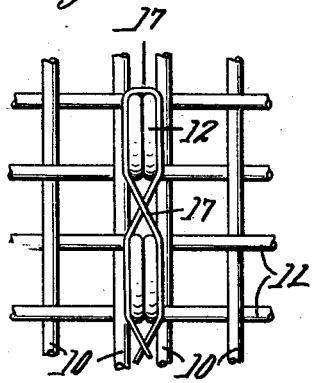
Fig. 6.
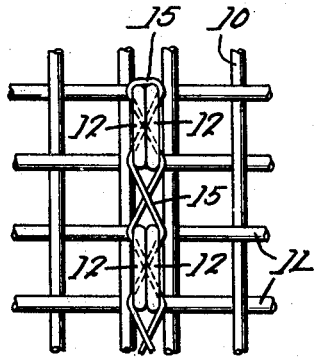
Fig. 4.
Fig. 5.
Inventor
Vernon C. King
By Attorneys
Southgate Fay & Hawley Patented June 24, 1930

1,766,754

UNITED STATES PATENT OFFICE

VERNON C. KING, OF WORCESTER, MASSACHUSETTS, ASSIGNOR TO WICKWIRE SPENCER STEEL COMPANY, OF NEW YORK, N. Y., A CORPORATION OF DELAWARE

SECTIONAL WIRE CONVEYER BELT

Application filed April 12, 1929. Serial No. 354,623.

This invention relates to wire belts or aprons, used for conveying a great variety of products from place to place. For certain purposes, such as the conveyance of tobacco leaves, it is necessary to provide belts of very substantial width, which wide belts are preferably made up by joining a plurality of unit belts side by side, the joints extending lengthwise of the combined belt or apron.

It is the general object of my invention to provide an improved means and method of joining such parallel sections of unit belts, by which means and method the different parts of a wide conveyer belt may be effectively secured together, while maintaining the flexibility of the belt unimpaired.

A further object is to provide a wide belt in which the sections or units are so joined that the upper or transporting face of the belt is substantially continuous and unobstructed. I also provide increased wearing material on the under side of the belt and reenforce the assembled belt against diagonal distortion.

My invention further relates to arrangements and combinations of parts which will be hereinafter described and more particularly pointed out in the appended claims.

A preferred form of the invention and a slight modification thereof are shown in the drawings in which Fig. 1 is a plan view of a portion of a wide conveyer belt embodying my improvements;

Fig. 2 is an enlarged detail view of a portion of the selvage of one of the unit belts;

Fig. 3 is a transverse sectional elevation, illustrating the method of assembling the unit belts;

Fig. 4 is a detail plan view showing the manner of lacing the unit belts together;

Fig. 5 is an enlarged sectional elevation of a portion of two unit belts in final united form; and Fig. 6 is a detail plan view showing an optional method of lacing.

While my improved sectional belt is not limited in its use to belts woven in a particular manner, I have illustrated the invention as applied to a wide belt made up of a plurality of unit belts B, each formed of warp wires 10 and weft wires 11. As shown in the drawings, the wires are interwoven to form an ordinary square mesh fabric. The fabric is distinctive, however, in that the weft wires 11, or certain of them, instead of being drawn tightly about the outermost warp wires 10, are projected outward beyond the selvage to form loops 12 at each edge of the fabric.

In assembling the unit belts B to form a wide conveyer belt or apron, the loops 12 are first bent upward at right angles to the body of the belt, and the edges of two adjacent unit belts are then butted together, as shown in Fig. 3, with the loops 12 preferably in close alignment with each other.

One or more lacing wires 15 are then interwoven through and around the abutting loops 12, as indicated in Fig. 4, each lacing wire being preferably passed through two abutting loops in one direction and being then passed in the opposite direction between adjacent pairs of loops, so that each lacing wire or portion of lacing wire passes through each successive pair of loops in the same direction and crosses the second lacing wire, which extends through said loops in the opposite direction.

After the abutting loops 12 are thus laced firmly together, the loops are bent apart and pressed downward against the face of the belt and the belt is then inverted so that the reversely bent loops 12 appear on the under side of the sectional belt, as indicated in Fig. 5.

It will be noted that the upper or transporting surface of the belt is thus left substantially continuous and entirely free of lacing wires or loops projecting above the plane thereof. This is an important advantage in my invention, as it permits a conveying belt or apron to be so constructed that it will present a substantially continuous and unbroken surface of any desired width.

The loops 12, disposed below the plane of the under side of the belt, constitute wearing portions which to a substantial extent protect the body of the belt as the belt is drawn over a supporting surface. The life of the belt is thus substantially prolonged. Furthermore, a belt formed of sections joined together as above described is found to more firmly resist diagonal distortion than is the case with a wide belt woven full width.

In Fig. 6 I have indicated a slight modification in the method of lacing the loops 12 together. In this figure, the lacing wire portions 17 are not passed through the loops 12, but pass alongside the loops, the lacing being crossed between adjacent pairs of loops. This method of lacing can be somewhat more quickly applied than the method shown in Fig. 4, in which the lacing wire is passed through as well as around the loops 12. The lacing shown in Fig. 6 is not quite as strong as that shown in Fig. 4, as there are only one half as many crossings of the lacing wires between the adjacent belt units, but the transverse strains in such a belt are comparatively slight and for many purposes the lacing shown in Fig. 6 is entirely satisfactory.

Having described my invention and the advantages thereof, I do not wish to be limited to the details herein disclosed, otherwise than as set forth in the claims, but what I claim is:—

1. A sectional wire conveyer belt comprising a plurality of unit belts having loops of weft wire projecting beyond the salvage and reversely bent over the body of the belt, and lacing wires interwoven around said projecting loops.

2. A sectional wire conveyer belt comprising a plurality of unit belts having loops of weft wire projecting beyond the selvage and reversely bent over the body of the belt, and lacing wires interwoven through and around said projecting loops.

3. The method of making a sectional wire conveyer belt which consists in weaving unit belts with loops of weft wire projecting beyond the selvage thereof, bending said loops substantially perpendicular to the plane of said unit belts, abutting the bent-up loops of adjacent belts, interweaving a wire lacing through and around said abutting loops and bending said loops apart and downward around said wire lacing and against the face of the belt.

4. The method of making a sectional wire conveyer belt which consists in weaving unit belts with loops of weft wire projecting beyond the selvage thereof, bending said loops substantially perpendicular to the plane of said unit belts, abutting and substantially aligning the bent-up loops of adjacent belts, interweaving a wire lacing around said abutting loops, and bending said loops apart and downward around said wire lacing and against the face of the belt.

In testimony whereof I have hereunto affixed my signature.

VERNON C. KING.